United States Patent [19]

Raines

[11] 4,434,883

[45] Mar. 6, 1984

[54] DEVICE FOR SHAFT ALIGNMENT IN A CLUTCH OR BRAKE ASSEMBLY

[75] Inventor: Charles D. Raines, Bethel, Minn.

[73] Assignee: Horton Manufacturing Co., Inc., Minneapolis, Minn.

[21] Appl. No.: 352,914

[22] Filed: Feb. 28, 1982

Related U.S. Application Data

[63] Continuation of Ser. No. 141,965, Apr. 21, 1980, abandoned.

[51] Int. Cl.³ .................... F16D 1/08; F16D 25/063
[52] U.S. Cl. ................................ 192/110 R; 192/70; 192/85 AB; 403/13; 403/365
[58] Field of Search ........... 192/110 R, 110 S, 85 AB, 192/70; 188/71.4; 403/370, 371, 13, 365

[56] References Cited

U.S. PATENT DOCUMENTS

| | | | |
|---|---|---|---|
| 892,932 | 7/1908 | Buettner et al. | 403/365 X |
| 1,579,359 | 4/1926 | Hallenback | 192/110 R X |
| 1,749,360 | 3/1930 | Strout | 192/110 S |
| 1,891,405 | 12/1932 | Ericksson | 403/371 X |
| 2,082,969 | 6/1937 | Myers | 192/110 R X |
| 3,889,784 | 6/1975 | Hanks | 192/85 AB X |
| 4,053,244 | 10/1977 | Dively | 403/13 |
| 4,272,872 | 6/1981 | Hess et al. | 403/371 X |

FOREIGN PATENT DOCUMENTS 1180477  6/1959  France ................. 403/370

*Primary Examiner*—Rodney H. Bonck
*Attorney, Agent, or Firm*—Wicks & Nemer

[57] ABSTRACT

A device for shaft alignment in a clutch or brake assembly is shown according to the teachings of the present invention. A quick demount bushing for receipt upon the shaft is provided having an outer tapered surface for receipt in an inner tapered bore formed in the assembly. The present invention further includes a shaft mount for receipt upon the shaft and into an axial bore of the assembly for holding the shaft in axial alignment with the assembly during placement of the quick demount bushing in the assembly whereby the friction surfaces are parallely disposed and normal to the longitudinal axis of the shaft. The shaft mount according to the teachings of the present invention is formed of a one piece bushing have a fixed thickness in the radial direction and also in the axial direction.

1 Claim, 2 Drawing Figures

DEVICE FOR SHAFT ALIGNMENT IN A CLUTCH OR BRAKE ASSEMBLY

This application is a continuation of application Ser. No. 141,965, filed Apr. 21, 1980 and now abandoned.

SUMMARY

The invention relates broadly to an improvement in clutches and brakes and more particularly to the mounting of the same on a shaft. In the mounting of a clutch or brake on a shaft the friction engaging surfaces must be parallely disposed and normal to the axis of the shaft for proper operation and minimal wear of the friction engaging surfaces. One method of aiding alignment is a dial indicator.

It is therefore an object of the invention to provide a device for mounting a shaft on a clutch or brake with alignment of the friction surfaces and with respect to the rotational axis of the shaft. The device includes a projection in one form of an annular collar positioned axially within a clutch or brake in spaced relation to a bushing which secures the hub of the clutch or brake to a shaft so that as the bushing is secured, the shaft is positioned and secured whereby the friction surfaces are parallely disposed and normal to the longitudinal axis of the shaft.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1:
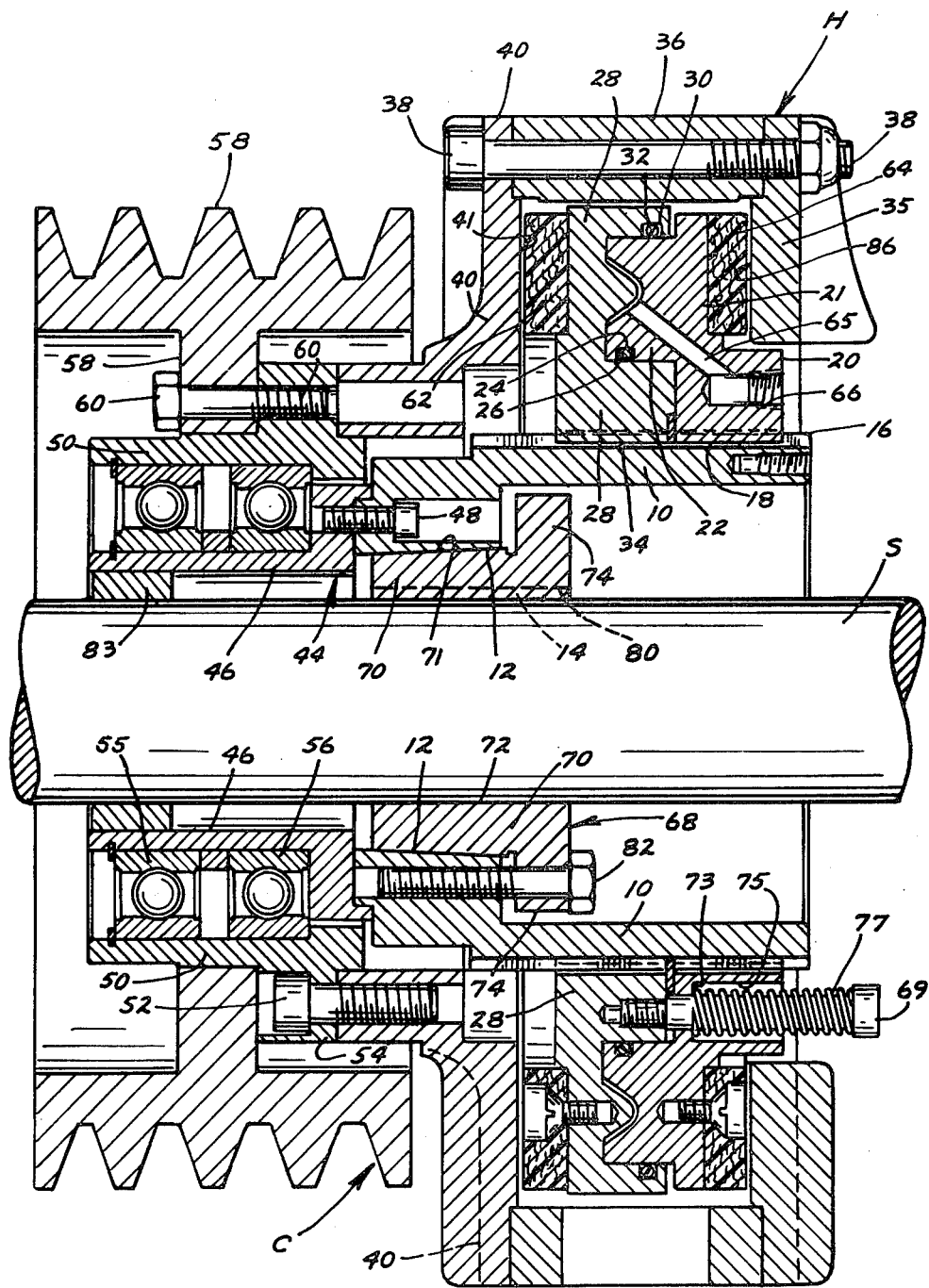
FIG. 1 is a sectional view of a clutch assembly having a mount for a shaft embodying the invention according to Section line 1—1 of FIG. 2.
Figure 2:
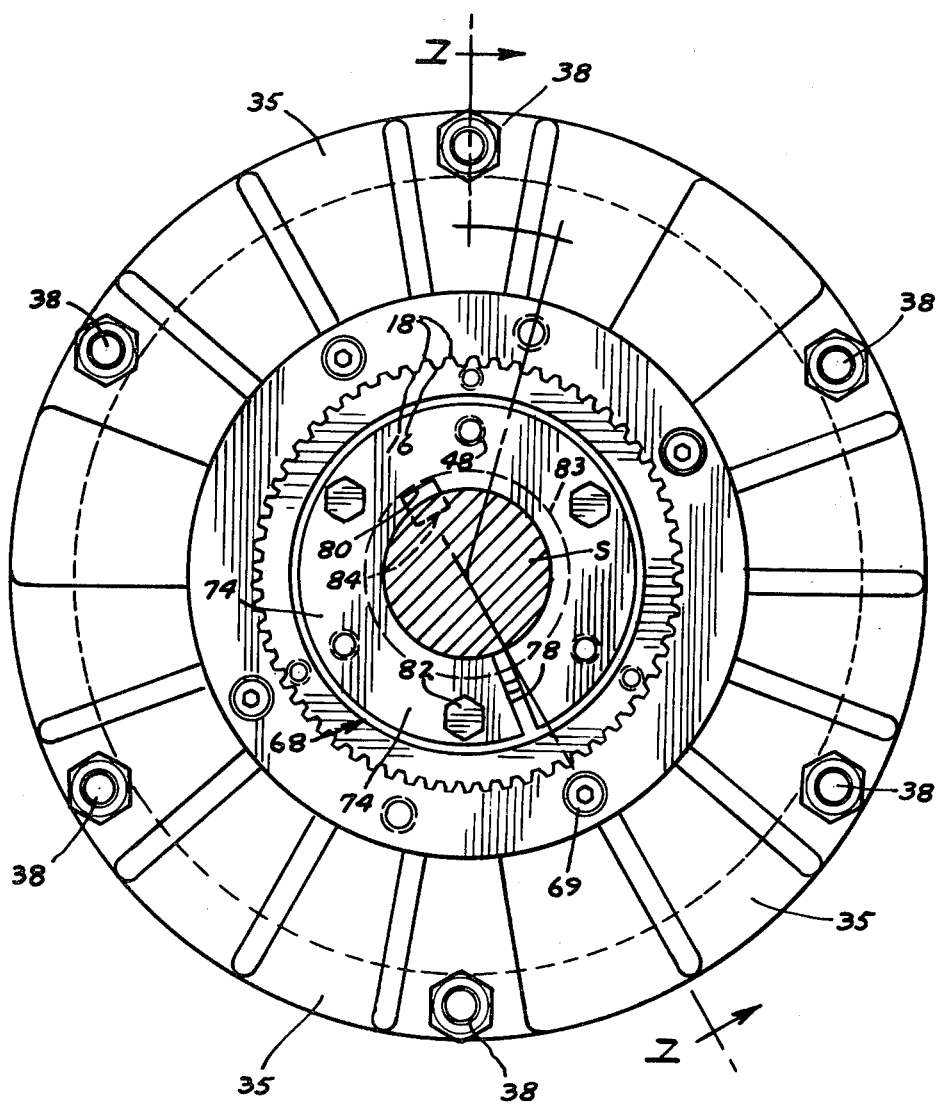
FIG. 2 is a face view of a clutch assembly having a mount for a shaft embodying the invention.

Referring to the drawings in detail, the clutch C includes the hub 10 formed with the inner tapered bore 12.

The outer surface of the hub is formed with a series of splines 16 which engage companion splines 18 formed internally of the annular piston-mount 20 having the annular piston 22. The piston 22 has formed on the inner surface thereof the groove 24 in which is positioned the O-ring 26. The mount 20 is formed with the friction facing carrying surface 21. The numeral 28 designates an annular cylinder which receives the annular piston 22, and formed in the cylinder wall surface is the annular groove 30 in which is positioned the O-ring 32. The O-ring provides sealing engagement between the piston and the cylinder. The annular cylinder 28 has formed thereon splines 34 which engage with the splines 16 of the hub 10.

Further provided is an annular housing H including a first ring housing plate 35 bolted to the annular ring 36 by means of a multiplicity of spaced bolts 38. Also secured to the annular ring 36 is a second ring housing plate 40 by means of the spaced bolts 38. The plate 40 is formed with the friction surface 41. A hollow cylindrical bearing housing 44 is provided which includes the inner annular portion 46 which is secured to the hub 10 axially thereof by means of a series of bolts 48. The housing 44 also includes the outer annular portion 50 which is secured to the second ring housing plate 40 by means of a series of cap screws 52 extending through the lugs 54 of the annular housing portion 50. Mounted between the bearing housing portions 46 and 50 are the bearings 55 and 56, and mounted on the bearing housing portion 50 is the sheave 58 by means of a series of spaced bolts 60.

The numeral 62 designates a friction facing secured to the outer face of the cylinder 28 and engageable with the friction surface 41 of plate 40, and secured to the outer surface 21 of the piston 22 is the friction facing 64. The piston 22 has formed therein the fluid conduit 65 leading to the cylinder area between the cylinder 28 and the piston 22 of the mount 20. The conduit 65 leads from the inlet 66 to which a conventional line of fluid pressure is attached.

The numeral 68 designates a conventional "QD bushing" (quick demount) which is made in different sizes to accommodate different size shafts with which the clutch C is used. The bushing 68 includes the collar portion 70 having the axial bore 72. The outer surface of the collar portion 70 is tapered as at 71, and the collar has formed thereon the radially extending flange 74. The collar portion and flange are split radially and extending along the axis by means of the slot 78, and both have the keyway 80 formed on the inner surface thereof.

The bushing 68 is held in operative axial position within the hub 10 by means of a series of spaced cap screws 82 which threadedly engage a portion of the hub 10. The bushing 68 is first keyed to the shaft S to be driven by means of a key 14 in the keyway 80 and the keyway 84 in the shaft S.

With fluid pressure caused to enter the conduit 65 by conventional means the cylinder 28 and piston 22 are separated whereby the friction facing 64 engages friction surface 86 of housing plate 35 and friction facing 62 engages the friction surface 41 of housing plate 40 whereby shaft S is clutched in through the transfer of power from the driven sheave 58. The piston 22 is normally urged into the cylinder 28 for clutch disengagement by means of a series of bolts 69 secured in the cylinder body 28 with a return spring 77 positioned on each of the bolts 69 between the head of the bolt and a shoulder 73 formed in a hole 75 formed in a portion of the mount 20.

Further provided is the shaft mount 83 which in one form is annular and it is press fit as a projection into the inner annular portion 46 of the bearing housing 44 carried by the hub, and the inner diameter of the mount 83 is a slip fit with the outer diameter of the shaft S. The mount 83 is positioned at the outer end of the bearing housing thereby placing it in spaced relation to the bushing 68. With such spaced relation pivoting between the bushing 68 and the clutch hub 10 is virtually prohibited during the tightening process of the bushing 68. The mount 83 may have a different inside diameter to accommodate different size shafts in a manner similar to that of different size bushings heretofore referred to.

The clutch C is securely mounted on the shaft S by inserting the shaft through the hub of the clutch C and the mount 83 thereof with the QD bushing 68 on the shaft. As a result, the shaft is initially held in axial alignment with the hub by means of the annular mount 83. Then the taper portion 71 of the bushing 68 is positioned into engagement with the taper 12 of the hub thereby centering the QD bushing and the shaft axially in the clutch C. The cap screws 82 are then tightened down which draws the taper 71 into a wedge fit with a taper 12 of the hub, whereby the bushing 68 is tightly fastened to the shaft and thereby the clutch. As a further result, the mount 83 assures the clutching planes are held normal to the axis of the shaft assuring that the friction facings and friction surfaces of the clutch are placed and held in parallel alignment.

It will be seen that the QD bushing together with the shaft therein must be in substantially perfect axial alignment with the axis of the hub in the clutch unit to assure that the friction surfaces are in proper parallel alignment and precisely normal to the axis of the shaft for proper friction engagement and for prevention of undue wear on the friction facings. As known, such alignment is done with conventional dial indicators when the QD bushing is drawn up into the hub, but with the shaft extended through and held by the mount 83, the bushing 68 is easily, quickly and positively aligned thereby properly aligning the clutch on the shaft.

The annular mount 83 may be used in either a clutch or a brake assembly when securing an assembly to a shaft and with the mount 83 means for aligning such as a dial indicator is not needed due to alignment facilitated by the shaft mount 83. Briefly, the annular mount 83 aligns the shaft and the QD bushing thereon relative to the taper of the hub, and as a result, the QD bushing is drawn up axially upon the taper of the hub which results in the proper alignment of the shaft relative to the friction surfaces of the clutch with the friction surfaces being held in parallel alignment for proper engagement and minimal wear.

After the bushing 68 is secured, the bushing 83 can be removed; however, as retained, it provides radial support to the bearing housing and the sheave thereon which in turn assures that the wedging action at the tapered surfaces 71 and 12 does not break which would allow later misalignment in the clutch.

Having thus described the invention, what is claimed as new and desired to be secured by Letters Patent is:

1. Device for centering and aligning a shaft in a clutch or brake assembly having an assembly housing, comprising, in combination: a quick demount bushing having a collar portion including an axial bore, with the diameter of the axial bore of the quick demount bushing being generally equal to the diameter of and for receipt onto the shaft; means for locking the quick demount bushing from relative rotation with the shaft; the quick demount bushing further including a tapered outer surface; the assembly housing including a hub having an axial bore being of greater diameter than the diameter of the shaft; the hub including an inner tapered bore having a shape complementary to and for receipt of the tapered outer surface of the quick demount bushing to form a wedge fit therebetween; means for holding the quick demount bushing in the inner tapered bore of the hub; and a shaft mount in the assembly housing in the form of a one piece bushing having a fixed thickness dimension in a radial direction and in the axial direction and having an outside diameter substantially euqal to the diameter of and for receipt into the axial bore of the hub and having an inside diameter substantially equal to the diameter of and for receipt onto the shaft for holding the shaft in axial alignment with the hub as the quick demount bushing is being inserted and drawn into the inner tapered bore of the hub, with the shaft mount being removable from the axial bore of the hub and from the shaft after the quick demount bushing is held by the holding means in the inner tapered bore of the hub with the shaft in axial alignment with the hub, the bushing allowing use of the same assembly housing with differing size shafts.

* * * * *